June 12, 1928.

C. S. BROWN 1,673,310

BALL AND SOCKET JOINT AND PROCESS OF FORMING THE SAME

Filed Sept. 6, 1923

Charles S. Brown, INVENTOR.

BY Parsons & Bidell, ATTORNEYS.

Patented June 12, 1928.

1,673,310

UNITED STATES PATENT OFFICE.

CHARLES S. BROWN, OF SYRACUSE, NEW YORK.

BALL-AND-SOCKET JOINT AND PROCESS OF FORMING THE SAME.

Application filed September 6, 1923. Serial No. 661,160.

This invention has for its object a particularly simple and efficient construction of balls for ball and socket joints and supporting brackets therefor and a process for forming such balls or attaching the balls to supporting plates or brackets. The invention consists in the novel features and in the steps hereinafter set forth and claimed.

In describing this invention, reference is had to the accompanying drawings in which like characters designate the corresponding parts in all the views.

Figure 1:
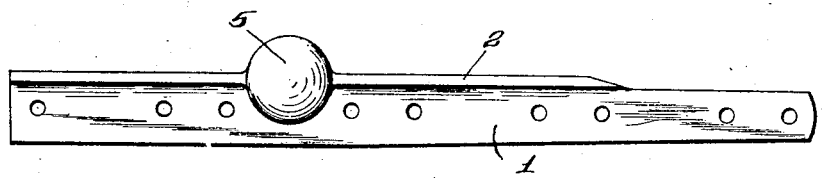
Figures 1 and 2 are respectively a plan and a side elevation of this ball and supporting bracket therefor.
Figure 2:
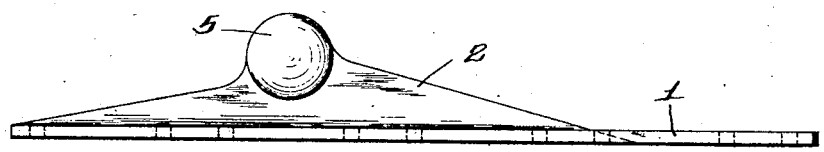

This ball is particularly for use on the reciprocating mower knives of mowing machines, which are actuated by means including a pitman having a socket for receiving the ball on the knife head. As ball and socket joints, and the use thereof in mowing machines and the like are well known, further description is thought to be unnecessary.

This ball and supporting bracket therefor comprises generally a plate having a part-discoidal portion and ball sections mounted on opposite sides of the plate concentric with the discoidal portions, the sections being of substantially the same radius as the discoidal portion.

1 designates the bracket which includes a suitable base plate for attachment to the back of a mower knife, and an angular portion 2 arranged at an angle to the base plate 1 and formed with a part-discoidal portion 3, this discoidal portion having a concentric opening 4 therein. By part-discoidal is meant a bracket which for the most part is a disk, it not being a complete disk for the reason that it is necessary that the disk be a part of a support or base. The bracket is made as nearly a complete disk as possible and practical.

5 are ball sections mounted on opposite sides of the discoidal portion 3 concentric therewith and being of substantially the same radius as the discoidal portion 3, these ball sections preferably having hubs 6 which fit into the opening 4.

The process of forming the ball and its support or of attaching the ball to its support consists of butt welding the ball sections 5 to the outer sides of the discoidal portion by compressing the interposed discoidal portion, after heating the metal of the ball sections and the discoidal portion upsetting the same toward the center of the ball sections; and holding from distortion the spherical surfaces of the sections with which the socket engages. Preferably the ball sections and the discoidal portions are compressed while electrically heating them by an electric current through a circuit in which the sections and the discoidal portion are connected in series. To facilitate the upsetting of the metal of the ball sections inwardly, and also to reduce the weight, the ball sections are formed with axial recesses 7 opening through the flat or opposing faces thereof. These recesses also form a receptacle for lubricating oil and after the ball sections are attached the ball is drilled at 7$^a$ and 7$^b$ to form inlet and outlet oil passages.

8 designates the opposing tools by means of which the compressing force is applied to the ball sections while welding these tools having concave or spherical recesses for fitting the spherical faces of the ball sections, to assist in holding the spherical surfaces from distortion while the ball sections are being attached or butt welded to the plate 3. These tools are usually called terminals as they are connected to a source of electrical energy which supplies the heat during the butt welding operation.

Figures 3, 4:
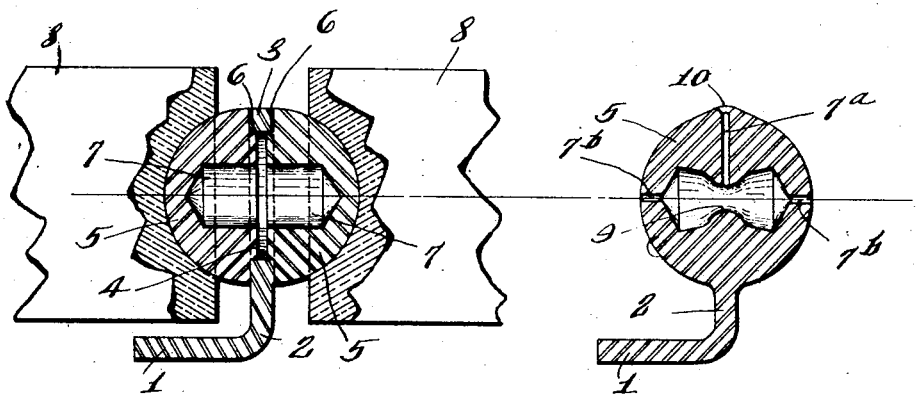
Figure 3 is an enlarged sectional view of the ball and bracket illustrating one step in the process of forming the same, the tools for attaching the parts together being shown.
Figure 4 is a view similar to Figure 3, showing the ball after the attaching operation is completed.

In Figure 3 is shown the first step of the process before the welding operation to the ball sections. The ball sections must be spaced apart from each other so as not to touch so that the current must pass through all parts to be welded together and not directly from one ball section to the other.

In Figure 4 is shown the completed article, after such operation, the course taken by the metal during the upsetting thereof being indicated at 9 and 10.

In balls of this type, the socket engages the opposite sides of the ball only and, hence, it is not required that the central or equatorial portion of the ball at 10 be spherical, although, if desired, the projection at 10 may be ground off.

By this process, a ball is readily and economically attached to a supporting bracket and the entire structure is unitary and especially strong. Furthermore, the ball sections can be accurately formed or more economically machined before welding and the accuracy of the active portion thereof is not affected by the welding operation.

What I claim is:

1. A ball and supporting bracket therefor comprising a plate having a part-discoidal portion formed with an opening therethrough concentric with the discoidal portion, and ball sections mounted on opposite sides of the plate and arranged concentric with and being of substantially the same radius as the discoidal portion, the sections having projections on their opposing faces located in said opening.

2. The process of forming a ball for ball and socket joints and attaching the same to a supporting bracket comprising placing ball sections concentrically on the opposite sides of a bracket having a part-discoidal portion formed with an opening concentric with the discoidal portion and with hubs of such sections, fitting such openings, the ball sections being of substantially the same radius as the discoidal portion of the bracket with which they are concentrically arranged, and compressing the sections axially toward each other while welding them on the plate between such sections.

3. The process of attaching balls to supporting plates comprising placing ball sections having axial hubs on their opposing faces and internal recesses opening through their opposing faces, on opposite sides of a plate with the hubs fitting an opening in such plate and spaced apart from each other and compressing the ball sections toward each other and the plate between the sections while passing an electric current through the ball sections and the interposed plate.

4. The process of attaching a ball to a supporting plate comprising placing semispherical ball sections concentrically on opposite sides of a part-discoidal plate formed with an opening therethrough with hubs of such sections in such openings and spaced apart from each other and butt welding the sections to opposite sides of the plate by passing an electric current through the ball sections and the interposed plate.

In testimony whereof, I have hereunto signed my name at Syracuse, in the county of Onondaga, and State of New York, this 14th day of July, 1923.

CHAS. S. BROWN.